US010267375B2

(12) United States Patent
Muranaka

(10) Patent No.: US 10,267,375 B2
(45) Date of Patent: Apr. 23, 2019

(54) DAMPER AND METHOD FOR MANUFACTURING DAMPER

(71) Applicant: NIFCO INC., Yokosuka-shi, Kanagawa (JP)

(72) Inventor: Makoto Muranaka, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/529,832

(22) PCT Filed: Nov. 20, 2015

(86) PCT No.: PCT/JP2015/082699
§ 371 (c)(1),
(2) Date: May 25, 2017

(87) PCT Pub. No.: WO2016/084739
PCT Pub. Date: Jun. 2, 2016

(65) Prior Publication Data
US 2017/0261059 A1    Sep. 14, 2017

(30) Foreign Application Priority Data

Nov. 27, 2014  (JP) .................................. 2014-240183

(51) Int. Cl.
*F16D 57/00* (2006.01)
*F16F 9/14* (2006.01)
(Continued)

(52) U.S. Cl.
CPC ................ *F16F 9/145* (2013.01); *A47C 1/02* (2013.01); *F16F 9/003* (2013.01); *F16F 9/12* (2013.01);
(Continued)

(58) Field of Classification Search
CPC ............... F16F 9/12; F16F 9/125; F16F 9/145
See application file for complete search history.

(56) References Cited

U.S. PATENT DOCUMENTS 4,691,589 A     9/1987  Arakawa
5,116,201 A *   5/1992  Fradenburgh ........... F16F 15/16
                                                    188/290
(Continued)

FOREIGN PATENT DOCUMENTS

EP      2573421 A1      3/2013
JP      H01-37236 Y2    11/1989
(Continued)

OTHER PUBLICATIONS

Europe Patent Office, "Search Report for European Patent Application No. 15862300.9," dated Jun. 8, 2018.
(Continued)

*Primary Examiner* — Nicholas J Lane
(74) *Attorney, Agent, or Firm* — Manabu Kanesaka

(57) ABSTRACT

A damper (10) includes a housing (11) and a rotor (16) combined with the housing (11) so as to be capable of rotating relative to the housing (11). The damper (10) includes an attenuating medium (90) filled in a rotation area inside the housing (11) wherein the rotor (16) rotates, and added with viscoelasticity by a viscoelasticity treatment; and an enclosure portion (80) provided outside the rotation area of the rotor (16), and communicating with the rotation area.

4 Claims, 5 Drawing Sheets

(51) Int. Cl.
  *A47C 1/02* (2006.01)
  *F16F 9/12* (2006.01)
  *F16F 9/00* (2006.01)
  *F16F 15/14* (2006.01)

(52) U.S. Cl.
  CPC ............ *F16F 15/1435* (2013.01); *F16F 9/14* (2013.01); *F16F 15/1414* (2013.01); *F16F 2224/048* (2013.01)

(56) References Cited

U.S. PATENT DOCUMENTS

| | | | | |
|---|---|---|---|---|
| 5,301,775 A * | 4/1994 | Nedbal | ............... | F16F 9/12 188/290 |
| 5,718,309 A * | 2/1998 | Kariya | ............... | F16F 9/12 188/290 |
| 2004/0155392 A1 * | 8/2004 | Doornbos | ............ | F16F 9/12 267/290 |
| 2009/0183959 A1 * | 7/2009 | Klit | ............... | F16F 9/53 188/267.1 |
| 2009/0277735 A1 * | 11/2009 | Yamaguchi | ............ | F16F 9/12 188/290 |
| 2013/0153347 A1 | 6/2013 | Oda et al. | | |
| 2013/0270049 A1 * | 10/2013 | Sherman | ............ | C10M 169/044 188/266 |
| 2013/0328342 A1 * | 12/2013 | Okimura | ............ | B60N 2/20 296/66 |

FOREIGN PATENT DOCUMENTS

| | | |
|---|---|---|
| JP | H06-241273 A | 8/1994 |
| JP | H10-299809 A | 11/1998 |
| JP | 3445766 B2 | 9/2003 |

OTHER PUBLICATIONS

PCT/ISA/210, "International Search Report for International Application No. PCT/JP2015/082699," dated Dec. 22, 2015.

* cited by examiner

DAMPER AND METHOD FOR MANUFACTURING DAMPER

RELATED APPLICATIONS

The present application is National Phase of International Application No. PCT/JP2015/082699 filed Nov. 20, 2015, and claims priority from Japanese Application No. 2014-240183, filed Nov. 27, 2014, the disclosure of which is hereby incorporated by reference herein in its entirety.

FIELD OF TECHNOLOGY

The present invention relates to a damper and a method for manufacturing the damper.

BACKGROUND ART

As for a damper buffering an impact applied from outside, there is known a rotary damper. The rotary damper provides a damping force that attenuates a torque to a rotor shaft by a resistance when a rotor rotates inside an attenuating medium having fluidity such as oil and the like.

As for the rotary damper, there is proposed a damper using a material having viscosity as the attenuating medium (for example, see Patent Document 1). In this damper, the rotor rotates while shearing the viscus material so as to generate the damping force, thereby, a large damping force can be obtained without enlarging the damper.

PRIOR ART DOCUMENT

Patent Document

Patent Document 1: Japanese Patent No. 3445766

SUMMARY OF THE INVENTION

Problems to be Solved by the Invention

When the viscous solid material and the like are used as the attenuating medium, it is preferable that the viscous material is filled in an area wherein the rotor rotates inside a housing without a gap. When air entering into a rotation area of the rotor is increased, there is a possibility of causing an operational failure by a contact between air and the rotor, and the like, so that a stable damping force cannot be obtained.

The present invention is made in consideration of the aforementioned actual situation, and an object thereof is to provide a damper which can stably obtain the damping force, and a method for manufacturing the damper.

Means for Solving the Problems

Hereinafter, means for obtaining the aforementioned object and an operation effect thereof will be described.

A damper obtaining the aforementioned object is a damper including a housing, and a rotation member combined with the relevant housing so as to be capable of turning relative to the housing, and the damper includes an attenuating medium filled in a rotation area of the rotation member, and added with viscoelasticity by a viscoelasticity treatment; and an enclosure portion provided outside the rotation area, communicating with the relevant rotation area, and enclosing an excess attenuating medium relative to the rotation area wherein the rotation member is combined.

A method for manufacturing the damper obtaining the aforementioned object is a method for manufacturing the damper including the housing, the rotation member combined with the relevant housing so as to be capable of turning relative to the housing, and a lid member closing an opening of the relevant housing, and the method for manufacturing the damper includes a process for filling the attenuating medium before the viscoelasticity is added, inside the housing wherein the rotation member is combined; a process for guiding the attenuating medium to the enclosure portion provided outside the rotation area of the rotation member, and communicating with the relevant rotation area by covering the lid member on the opening of the housing; and a process for adding the viscoelasticity to the attenuating medium inside the housing by applying the viscoelasticity treatment relative to the attenuating medium inside the rotation area and the attenuating medium inside the enclosure portion.

In the aforementioned structure or method, in the damper, outside the rotation area of the rotation member, there is provided the enclosure portion wherein the attenuating medium is enclosed. Consequently, the attenuating medium before the viscoelasticity treatment is applied is injected into the housing and the like slightly more for a portion of guiding to the enclosure portion, and the rotation area is partitioned by the rotation member or members other than that, so that the rotation member can guide the excess attenuating medium relative to a volume of the rotation area wherein the rotation member is combined, to the enclosure portion. Thereby, the attenuating medium can be filled inside the rotation area thoroughly. Furthermore, after the attenuating medium is injected into the housing, the viscoelasticity treatment is applied so as to add the viscoelasticity to the attenuating medium inside the rotation area and the attenuating medium stored inside the enclosure portion. Consequently, a mixture of air caused by a gap wherein the attenuating medium is not filled in the rotation area can be suppressed. Furthermore, in the enclosure portion, air is enclosed together with the attenuating medium, however, since the enclosure portion is provided outside the rotation area, even if the rotation member moves, the mixture of air into the rotation area from the enclosure portion can be suppressed. Therefore, a damping force can be increased using the attenuating medium having the viscoelasticity, and a stable damping force can be obtained by suppressing the mixture of air into the rotation area.

In the aforementioned damper, preferably, the enclosure portion is the first enclosure portion, and a second enclosure portion enclosing the attenuating medium is provided between the housing and a shaft portion which becomes a rotation center of the rotation member.

In the aforementioned structure, the enclosure portion is provided between the housing and the shaft portion of the rotation member. After the attenuating medium is guided to the enclosure portion, the viscoelasticity is added to the attenuating medium, so that the attenuating medium thereof seals between the housing and the shaft portion of the rotation member. Thereby, a seal member such as a gasket and the like can be unnecessary. Also, a portion wherein the second enclosure portion is provided is located between the housing and the shaft portion of the rotation member, so that compared to the attenuating medium which contacts an outer portion more in a radial direction than the shaft portion in the rotation member, a movement of the attenuating medium can be controlled. Consequently, even in a case wherein the enclosure portion is provided between the housing and the shaft portion of the rotation member, the mixture of air into the rotation area from the enclosure portion can be suppressed.

In the aforementioned damper, preferably, the enclosure portion is the first enclosure portion, and a second enclosure portion is provided between the lid member closing the opening of the housing and the shaft portion which becomes the rotation center of the rotation member.

In the aforementioned structure, the enclosure portion is provided between the lid member and the shaft portion of the rotation member. After the attenuating medium is guided to the enclosure portion, the viscoelasticity is added to the attenuating medium, so that the attenuating medium thereof seals between the lid member and the shaft portion of the rotation member. Thereby, the seal member such as the gasket and the like can be unnecessary. Also, the portion wherein the second enclosure portion is provided is located between the lid member and the shaft portion of the rotation member, so that compared to the attenuating medium which contacts the outer portion more in the radial direction than the shaft portion in the rotation member, the movement of the attenuating medium is controlled. Consequently, even in a case wherein the enclosure portion is provided between the lid member and the shaft portion of the rotation member, the mixture of air into the rotation area from the enclosure portion can be suppressed.

In the aforementioned damper, preferably, the enclosure portion includes a bend structure. In the aforementioned structure, the enclosure portion includes the bend structure, so that even in a limited space, a volume of the enclosure portion can be increased.

In the aforementioned damper, preferably, the damper is formed to be applicable to a turn structure turning a seat back relative to a seat cushion including a seating surface.

In the aforementioned structure, the damper rotates while shearing the attenuating medium added with the viscoelasticity so as to generate the damping force. Consequently, the damper can generate the damping force sufficient to buffer an impact accompanied by a turning movement of the seat back.

BEST MODES OF CARRYING OUT THE INVENTION

First Embodiment

Hereinafter, one specific embodiment of a damper and a method for manufacturing the damper will be explained.

Figure 1:
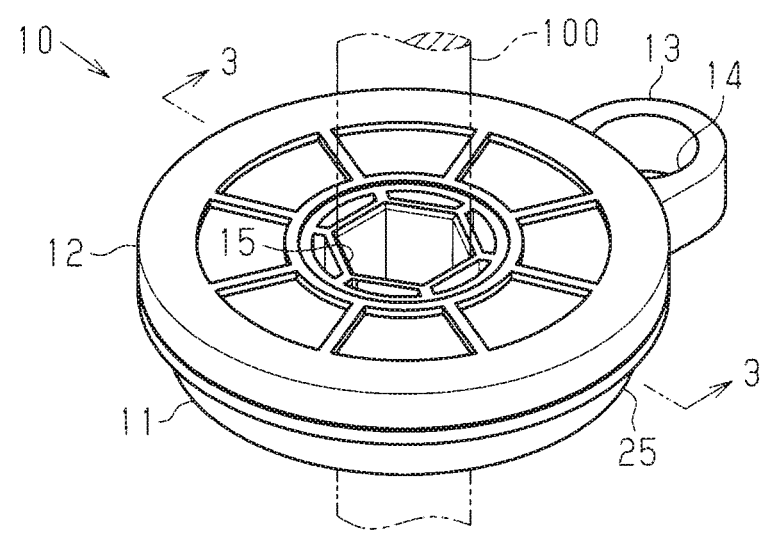
FIG. 1 is a perspective view showing a whole structure of a damper after an assembly, for a first embodiment of the damper and a method for manufacturing the damper according to the present invention.

With reference to FIG. 1, a structure of a damper 10 will be explained. The damper 10 is a rotary damper, and comprises a housing 11, and a cap 12 closing an opening of the housing 11. When the damper 10 connects an attenuating object which is an object wherein a damping force is added by the damper 10, and a support member supporting the damper 10, at least one of the housing 11 and the cap 12 is directly or indirectly connected to either one of the attenuating object or the support member, and the housing 11 and the cap 12 are respectively made of resin.

On an outer peripheral face of a peripheral wall portion 25 of the housing 11, there is provided an attachment portion 13 including an attachment hole 14. The damper 10 is fixed in the support member by fastening a fastening member and the like to the attachment hole 14. Also, the damper 10 includes a shaft hole 15 at a center thereof. In the shaft hole 15, a turning shaft 100 which is the attenuating object wherein a braking torque is added is rotatably inserted relative to the damper 10.

Figure 2:
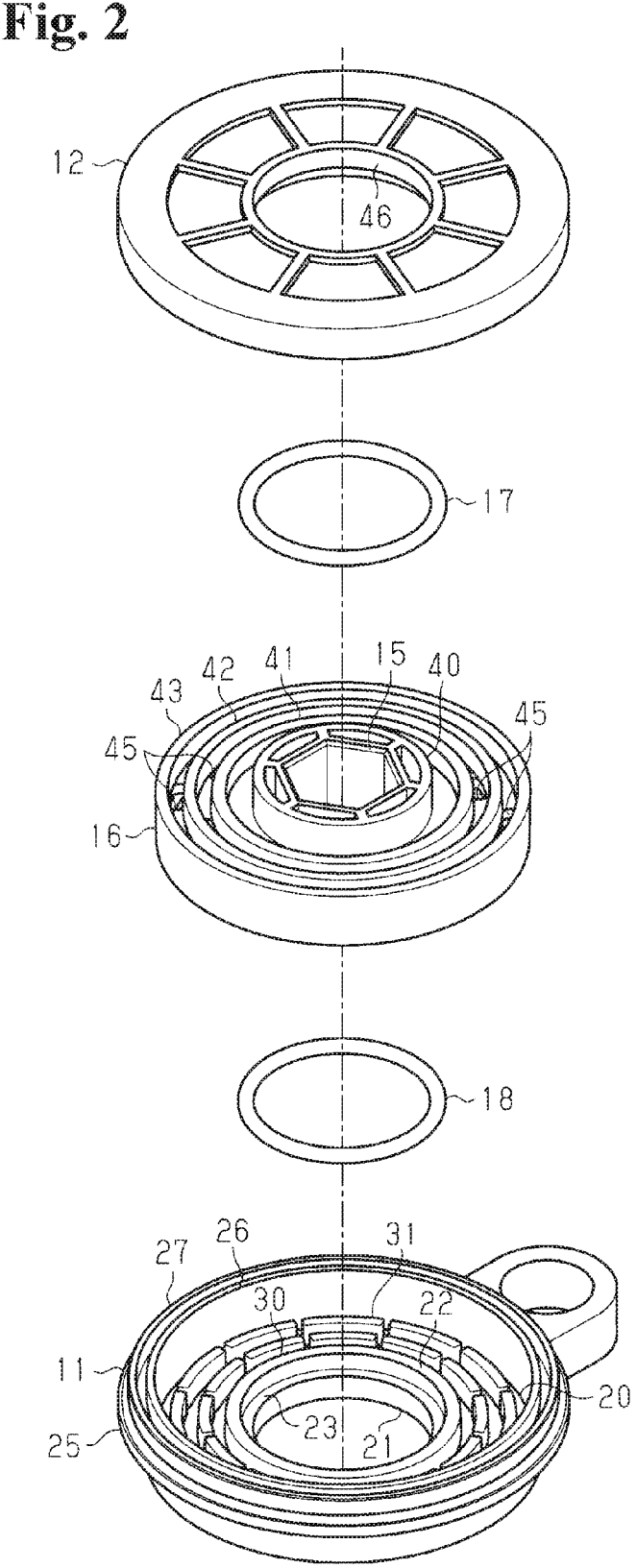
FIG. 2 is an exploded perspective view of the damper of the same embodiment.

As shown in FIG. 2, the housing 11 is formed in a cylindrical shape including a bottom portion 20. In the bottom portion 20, there are formed a through hole 21, and a center projecting portion 22 having a cylindrical shape surrounding the through hole 21. Inside the center projecting portion 22, there is formed a step portion 23.

At a tip of the peripheral wall portion 25 of the housing 11, there is provided a pair of annular projecting portions 26 and 27. The annular projecting portions 26 and 27 have an annular shape along the peripheral wall portion 25, and are provided concentrically. A gap is provided between the annular projecting portions 26 and 27.

Also, in the bottom portion 20, there are provided a plurality of inside arc-like projecting portions 30 and a plurality of outside arc-like projecting portions 31 between the peripheral wall portion 25 and the through hole 21. The inside arc-like projecting portions 30 have an arc shape viewed from an opening side of the housing 11, and are provided through a gap between adjacent inside arc-like projecting portions 30. The plurality of inside arc-like projecting portions 30 is provided in such a way as to form an annular shape as a whole.

The outside arc-like projecting portions 31 are provided on a peripheral wall portion 25 side more than the inside arc-like projecting portions 30. The outside arc-like projecting portions 31 have an arc shape viewed from the opening side of the housing 11, and a length in a longitudinal direction thereof is longer than the inside arc-like projecting portions 30. The outside arc-like projecting portions 31 are provided through a gap between adjacent outside arc-like projecting portions 31. The outside arc-like projecting portions 31 are provided in such a way as to form an annular shape as a whole.

In the housing 11, there is housed a rotor 16 as a rotation member in such a way so as to be capable of turning in a clockwise direction, and turning in a counterclockwise direction. The rotor 16 is a structure member directly or indirectly connected to an object which is not connected to the housing 11 or the cap 12 in the attenuating object and the support member. The rotor 16 is made of resin, and formed in a disk shape. Also, an annular seal member 18 formed by an elastic material such as elastomer and the like is provided between the housing 11 and the rotor 16.

The rotor 16 includes a shaft portion 40 which is a shaft portion to become a rotation center of the rotor 16 at a center thereof. The shaft portion 40 has a cylindrical shape, and includes the shaft hole 15 at an inside thereof. The shaft portion 40 is provided on an upper face and a lower face of the rotor 16. The shaft portion 40 on an upper face side is turnably inserted into the cap 12, and the shaft portion 40 on a lower face side is turnably inserted into the through hole 21 of the housing 11.

Also, on the upper face of the rotor 16, there are provided three annular upper rotor projecting portions 41 to 43 concentrically. Also, on the lower face of the rotor 16 as well, there are provided three annular lower rotor projecting portions 51 to 53 (see FIG. 3) concentrically. The upper rotor projecting portions 41 to 43 and the lower rotor projecting portions 51 to 53 have the same structure, and differ only in that they are formed on the upper face and the lower face of the rotor 16 symmetrically.

Gaps are provided among the upper rotor projecting portions 41 to 43. Also, gaps are provided among the lower rotor projecting portions 51 to 53 as well. Also, in the rotor 16, there is formed a communication hole 45 passing through from the upper face thereof to the lower face. The communication hole 45 is between the inside upper rotor projecting portion 41 and the center upper rotor projecting portion 42, and a plurality of communication holes 45 is formed between the inside lower rotor projecting portion 51 and the center lower rotor projecting portion 52. Also, the communication hole 45 is between the center upper rotor projecting portion 42 and the outside upper rotor projecting portion 43, and the plurality of communication holes 45 is formed between the center lower rotor projecting portion 52 and the outside lower rotor projecting portion 53.

The cap 12 has the disk shape, and at a center thereof, there is formed a through hole 46 through which the shaft portion 40 of the rotor 16 is inserted. An annular seal member 17 formed by an elastic member such as the elastomer and the like is provided between the cap 12 and the rotor 16.

Figure 3:
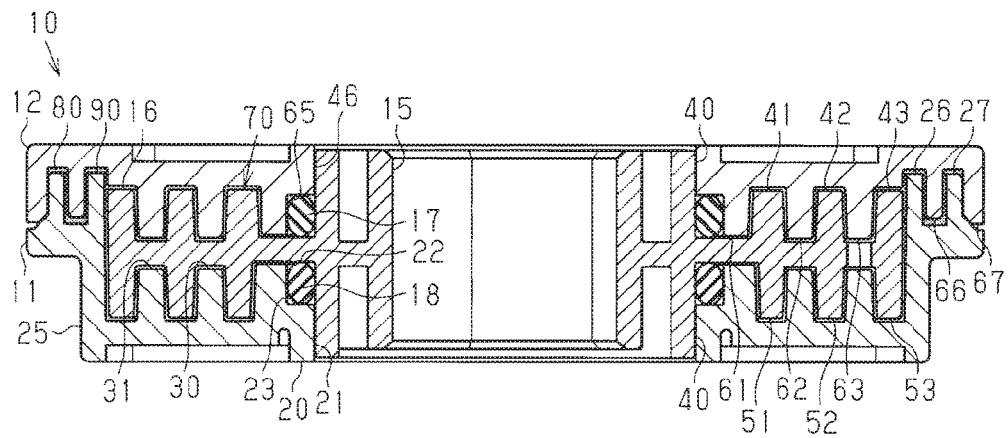
FIG. 3 shows the damper of the same embodiment, and is a cross-sectional view taken along a line 3-3 in FIG. 1.

As shown in FIG. 3, on a lower face of the cap 12, there are provided cap projecting portions 61 to 63. The cap projecting portions 61 to 63 fit in a gap between the shaft portion 40 of the rotor 16 and the upper rotor projecting portion 41, and the gaps among the upper rotor projecting portions 41 to 43. The cap projecting portions 61 to 63 have an annular shape, and are formed concentrically on the lower face of the cap 12. A step portion 65 is provided between an inside of the cap projecting portion 61 which becomes the innermost in a radial direction, and the through hole 46.

Moreover, on the lower face of the cap 12, there is concentrically provided a pair of cap annular projecting portions 66 and 67 on an outer side in the radial direction of the cap 12 more than the cap projecting portions 61 to 63. A gap is provided between the cap annular projecting portions 66 and 67.

When the rotor 16 is housed in the housing 11, the lower rotor projecting portions 51 to 53 of the rotor 16 fit between the center projecting portion 22 of the housing 11 and the inside arc-like projecting portion 30; between the inside arc-like projecting portion 30 and the outside arc-like projecting portion 31; and between the outside arc-like projecting portion and the peripheral wall portion 25. The lower rotor projecting portions 51 to 53 and a housing 11 side are in a loose fit, and there are provided minute gaps for filling an attenuating medium 90 having both viscosity and elasticity therebetween.

Also, when the cap 12 closes the opening of the housing 11, the upper rotor projecting portions 41 to 43 of the rotor 16 respectively fit between the inside cap projecting portion 61 and the center cap projecting portion 62; between the center cap projecting portion 62 and the outside cap projecting portion 63; and between the outside cap projecting portion 63 and the peripheral wall portion 25 of the housing 11.

The upper rotor projecting portions 41 to 43, a cap 12 side, and the housing 11 side are in a loose fit, and there are provided minute gaps for filling the attenuating medium 90 therebetween.

In a space partitioned by the housing 11 and the cap 12, an area wherein an outer portion more in the radial direction than the shaft portion 40 of the rotor 16 rotates is a rotation area. The rotation area includes a volume of the outer portion more in the radial direction than the shaft portion 40 in the rotor 16 as well. Also, the area (gap) partitioned by the outer portion more in the radial direction than the shaft portion 40 in the rotor 16, and the cap 12; and the area (gap) partitioned by the outer portion more in the radial direction than the shaft portion 40 in the rotor 16, and the housing 11, are a torque generating area 70. The torque generating area 70 is a gap between the housing 11 and the rotor 16, and a gap between the cap 12 and the rotor 16, and does not include the volume of the outer portion more in the radial direction than the shaft portion 40 in the rotor 16. The rotor 16 rotates while shearing the attenuating medium 90 inside the torque generating area 70 so as to add a damping force that attenuates a force attempting to rotate the rotor 16.

For example, when the rotor 16 rotates by following a rotation of the turning shaft 100, the braking torque which is the damping force is added to the turning shaft 100 by a resistance of the attenuating medium 90 inside the torque generating area 70. Also, the attenuating medium 90 firmly adheres in the radial direction of the rotor 16 through the gap of the inside arc-like projecting portion 30 and the gap of the outside arc-like projecting portion 31, and firmly adheres in an up-and-down direction of the rotor 16 through the communication hole 45. The rotor 16 rotates while shearing the attenuating medium 90 firmly adhering through the communication hole 45, or the attenuating medium 90 firmly adhering through the gap of the inside arc-like projecting portion 30 and the gap of the outside arc-like projecting portion 31. Thus, even by rotating while shearing the attenuating medium, the braking torque is added to the turning shaft 100.

Also, when the cap 12 is mounted on the housing 11, the annular projecting portions 26 and 27 of the housing 11 fit in the cap annular projecting portions 66 and 67. There is provided a minute gap between the annular projecting portions and 27 of the housing 11 and the cap annular projecting portions 66 and 67 which are in a fitting state. This gap functions as an enclosure portion 80 enclosing the attenuating medium 90 which becomes excess relative to a volume of the torque generating area 70 together with air. The enclosure portion 80 is provided outside the rotation area of the rotor in the radial direction of the shaft portion 40, i.e., outside the torque generating area 70.

In the enclosure portion 80, the pair of annular projecting portions 26 and 27 of the housing 11 and the pair of cap annular projecting portions 66 and 67 are combined to be formed so as to include a bend structure (labyrinth structure)

bending a plurality of times toward an outside of the housing 11 and the cap 12 from a torque generating area 70 side. Also, the enclosure portion 80 is provided annularly along the peripheral wall portion 25 of the housing 11 viewed from the cap 12 side (upper face side) of the damper 10.

Also, in the through hole 21 of the housing 11, the shaft portion 40 on a lower side of the rotor 16 is inserted to pass through, and in the through hole 46 of the cap 12, the shaft portion 40 on an upper side of the rotor 16 is inserted to pass through. The seal member 18 is provided between the step portion 23 of the housing 11 and the rotor 16, and the seal member 17 is provided between the step portion 65 of the cap 12 and the rotor 16.

Next, the attenuating medium 90 will be explained. The attenuating medium 90 is a media wherein viscoelasticity is increased and fluidity is reduced by a viscoelasticity treatment which adds the viscoelasticity. The attenuating medium 90 is called, for example, a silicone gel, an urethane gel, and the like, and has a raw material of monomer or prepolymer of an acrylic type, an urethane type, and the like in addition to a silicon type, and before and after applying the viscoelasticity treatment, the attenuating medium 90 has different viscoelasticity.

The viscoelasticity treatment is a treatment for crosslinking the monomer or the prepolymer, and is selected depending on a type thereof. The viscoelasticity treatment is the treatment wherein at least one of treatments of, for example, adding an initiator for initiating an addition of viscoelasticity; leaving for a predetermined time; heating; contacting moisture in an atmosphere; and a light irradiation of a predetermined wavelength such as a ultraviolet light and the like, is carried out.

For example, in the attenuating medium 90, the viscoelasticity is added by heating after mixing a main agent and the initiator. Incidentally, the main agent may be one type of liquid, or a plurality of types of liquid as well. Also, in a case wherein a heat treatment is used for the viscoelasticity treatment in this manner, the housing 11, the rotor 16, and the cap 12 are formed by a material having a heat resistance which withstands heating at a heating temperature.

Otherwise, after mixing the main agent and the initiator, the attenuating medium 90 is left for the predetermined time so that the viscoelasticity is added. Otherwise, after mixing the main agent and the initiator, the attenuating medium 90 is applied to the light irradiation so that the viscoelasticity is added. Thus, in a case wherein the light irradiation of a specific wavelength is used for the viscoelasticity treatment, the housing 11, the rotor 16, and the cap 12 are formed by a material having translucency which transmits the light of the wavelength thereof.

Next, with reference to FIG. 4 to FIG. 6, a method for manufacturing the damper 10 will be explained with procedures of an assembly thereof.

Figure 4:
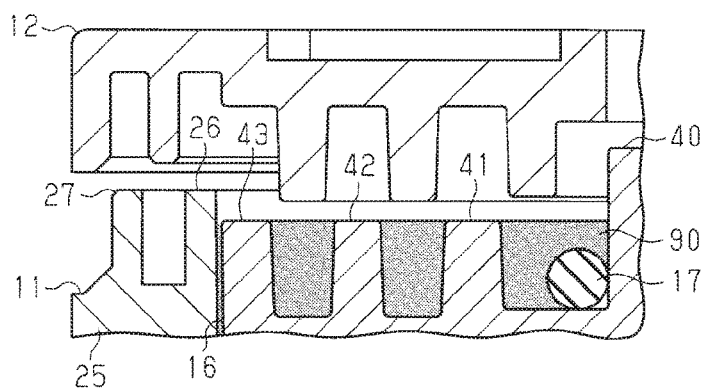
FIG. 4 is a drawing showing the method for manufacturing the damper of the same embodiment.

First, as shown in FIG. 4, the rotor 16 wherein the seal members 17 and 18 are externally fitted is housed in the housing 11. In that state, an upper end of the rotor 16, i.e., tips of the upper rotor projecting portions 41 to 43 are located lower than tips of the annular projecting portions 26 and 27 of the housing 11. Thus, in a state wherein the rotor is housed in the housing 11, the attenuating medium 90 before the viscoelasticity treatment is applied is injected into the housing 11. An injection amount of the attenuating medium 90 is greater than the volume of the torque generating area 70, and is an amount wherein an attenuating medium amount for a portion of enclosing into the enclosure portion 80 is added. For example, as shown in FIG. 4 as an example, the attenuating medium 90 may be filled to an end portion of the upper side of the rotor 16, or the attenuating medium 90 may be filled to an upper end of the housing 11. Also, when the attenuating medium 90 is injected into the housing 11, in order to reduce a mixed air amount into the attenuating medium 90, it is preferable to inject the attenuating medium 90 under a reduced-pressure atmosphere.

The attenuating medium 90 before the viscoelasticity treatment is applied has a low viscosity and the fluidity so as to flow into a minute gap between the housing 11 and the rotor 16, the gaps of the plurality of upper rotor projecting portions 41 to 43, the gaps of the lower rotor projecting portions 51 to 53, and the like.

Figure 5:
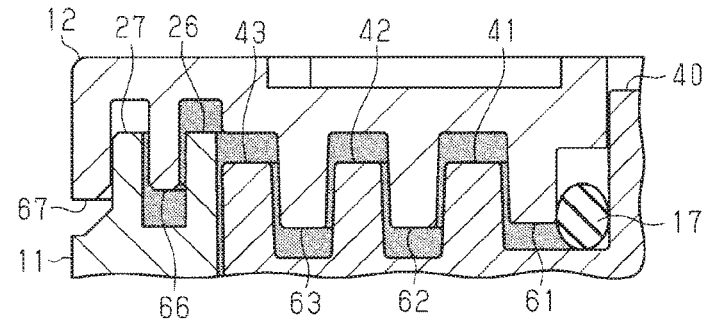
FIG. 5 is a drawing showing the method for manufacturing the damper of the same embodiment.

Next, as shown in FIG. 5, the cap 12 is mounted on the housing 11 wherein the attenuating medium 90 is filled. At that time, the attenuating medium 90 located between the shaft portion 40 and the upper rotor projecting portion 41, or in the gaps of the upper rotor projecting portions 41 to 43 are pushed out when the cap projecting portions 61 to 63 fit in the aforementioned gaps. When the pushed-out attenuating medium 90 overflows from an opening edge of the housing 11, the annular projecting portions 26 and 27 of the housing 11 and the cap annular projecting portions 66 and 67 are located in the fitting state. Consequently, the pushed-out excess attenuating medium 90 is guided between the annular projecting portions 26 and 27 of the housing 11 and the cap annular projecting portions 66 and 67. Incidentally, even when the cap 12 is mounted, it is preferable to mount the cap 12 under the reduced-pressure atmosphere.

Figure 6:
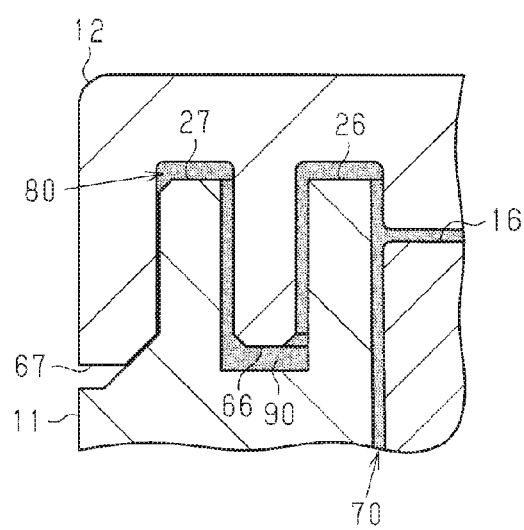
FIG. 6 is a drawing showing the method for manufacturing the damper of the same embodiment.

As shown in FIG. 6, when the cap 12 is mounted on the housing 11, it becomes a state wherein the excess attenuating medium 90 is stored in the enclosure portion 80 formed by the annular projecting portions 26 and 27 of the housing 11 and the cap annular projecting portions 66 and 67. At that time, as needed, an outer edge of the cap 12 and an outer edge of the housing 11 may be thermally welded.

The seal member 17 externally fitted in the rotor 16 is pushed into a space partitioned by the step portion 65 of the cap 12 and the rotor 16, and seals between the cap 12 and the rotor 16 on a shaft portion 40 side of the rotor 16. The seal member 18 externally fitted in the rotor 16 is pushed into a space partitioned by the step portion 23 of the housing 11 and the rotor 16, and seals between the housing 11 and the rotor 16 on the shaft portion 40 side of the rotor 16.

Thus, in the state wherein the excess attenuating medium 90 is stored in the enclosure portion 80, the viscoelasticity treatment is applied relative to the attenuating medium 90 inside the damper 10. For example, the attenuating medium 90 inside the damper 10 is heated at a predetermined temperature for a predetermined time so as to add the viscoelasticity to the attenuating medium. Incidentally, it is preferable that a variation amount of a volume of the attenuating medium 90 is small when the viscoelasticity treatment is applied.

The viscoelasticity is added to the attenuating medium inside the enclosure portion 80 so as to seal a connecting portion between an edge portion of the cap 12 and the tip of the peripheral wall portion 25 of the housing 11. Consequently, a seal member such as a gasket and the like becomes unnecessary at the relevant connecting portion.

Next, an operation of the damper 10 will be explained. In a manufacturing process, the attenuating medium 90 exceeding the volume of the torque generating area 70 is injected, and the excess attenuating medium is enclosed in the enclosure portion 80 in advance so as to be in a state wherein the attenuating medium 90 having the viscoelasticity is filled thoroughly in the torque generating area 70.

Also, if the injection amount of the attenuating medium 90 is an amount exceeding a capacity of the torque generating area 70, for example, even if there is a variation of the injection amount, at least a variation of an amount of the attenuating medium filled in the torque generating area 70 is suppressed. Consequently, a variation of an attenuating medium amount due to individual differences can be suppressed as well. Therefore, air caused by an insufficient injection of the attenuating medium 90 can be suppressed from being mixed.

Also, the attenuating medium including air is enclosed in the enclosure portion 80, however, the enclosure portion 80 is provided outside the torque generating area 70 wherein the rotor 16 rotates. Consequently, air enclosed in the enclosure portion 80 is suppressed from being mixed into the torque generating area 70 accompanied by a rotation of the rotor 16. Therefore, the damper 10 can suppress an operational failure caused by air, and generate a stable damping force compared to a damper without the enclosure portion 80.

As explained above, with respect to the damper and the method for manufacturing the damper according to the present embodiment, the following effects can be obtained.

(1) In the damper 10, the enclosure portion 80 to which the attenuating medium 90 is enclosed is provided outside the torque generating area 70 which is a movable area wherein the rotor 16 which is a movable member rotates. Consequently, the attenuating medium 90 before applying the viscoelasticity treatment is injected into the housing 11 slightly more for a portion of guiding to the enclosure portion 80, and the cap 12 is mounted on the housing 11, so that the attenuating medium 90 which becomes excess relative to the volume of the torque generating area 70 can be guided to the enclosure portion 80. Thereby, the attenuating medium 90 can be filled thoroughly inside the torque generating area 70. Furthermore, after the attenuating medium 90 is injected into the housing 11, the viscoelasticity treatment is applied so as to add the viscoelasticity to the attenuating medium 90 inside the torque generating area 70 and the attenuating medium 90 stored inside the enclosure portion 80. Consequently, a mixture of air caused by a gap wherein the attenuating medium 90 is not filled in the torque generating area 70 can be suppressed. Furthermore, air is enclosed in the enclosure portion 80 together with the attenuating medium 90, however, since the enclosure portion 80 is provided outside the torque generating area 70, even when the rotor 16 rotates, the mixture of air into the torque generating area 70 from the enclosure portion can be suppressed. Therefore, the damping force can increase by using the attenuating medium 90 having the viscoelasticity, and the stable damping force can be obtained by suppressing the mixture of air into the torque generating area 70.

(2) The enclosure portion 80 includes the bend structure so as to increase a volume of the enclosure portion 80 even in a limited space inside the housing 11.

Second Embodiment

Next, a second embodiment of the damper and the method for manufacturing the damper will be explained with a focus on differences with the first embodiment. Incidentally, the damper and the method for manufacturing the damper according to the present embodiment have a basic structure thereof equal to that of the first embodiment as well, and an overlapping explanation will be omitted.

The damper 10 of the present embodiment has in common with the first embodiment in terms of comprising the enclosure portion 80, however, the damper 10 of the present embodiment differs from the first embodiment in terms of comprising enclosure portions between the housing 11 and the shaft portion which becomes the rotation center of the rotor 16, and between the cap 12 and the shaft portion 40. Hereinafter, the enclosure portion 80 provided between the housing 11 and the cap 12 will be explained as the first enclosure portion 80, and the enclosure portions provided between the housing 11 and the shaft portion 40, and between the cap 12 and the shaft portion 40 will be explained as second enclosure portions 81.

Figure 7:
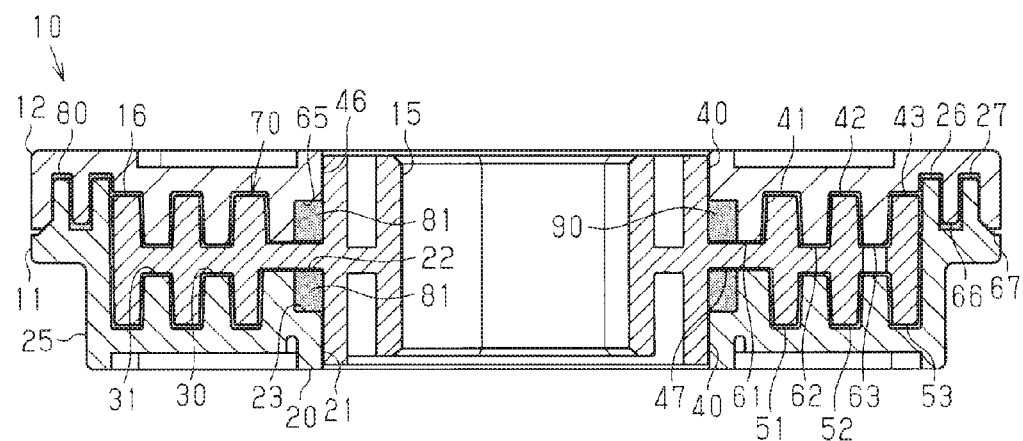
FIG. 7 is a drawing showing a cross section of the damper after the assembly for a second embodiment of the damper and the method for manufacturing the damper according to the present invention.

As shown in FIG. 7, a space partitioned by the step portion 23 of the housing 11, a side face of the shaft portion 40 of the rotor 16, and an extension portion 47 extending from the shaft portion 40 of the rotor 16 toward the upper rotor projecting portion 41 and a lower rotor projecting portion 51 side is the second enclosure portion 81 enclosing the attenuating medium 90. Also, a space partitioned by the step portion 65 of the cap 12, the side face of the shaft portion 40 of the rotor 16, and the extension portion 47 of the rotor 16 is the second enclosure portion 81 enclosing the attenuating medium 90 as well. The second enclosure portion 81 encloses the excess attenuating medium of the torque generating area 70 together with air in the spaces wherein the seal members 17 and 18 are provided in the first embodiment.

When the damper 10 comprising the second enclosure portion 81 is manufactured, the injection amount of the attenuating medium 90 injected into the housing 11 is larger than the volume of the torque generating area 70, and is an amount wherein the attenuating medium amount for a portion of enclosing into the first enclosure portion 80 and the second enclosure portion 81 is added.

When the cap 12 is mounted on the housing 11 filled with the attenuating medium 90, it becomes a state wherein the attenuating medium 90 is stored not only in the first enclosure portion 80, but also in the second enclosure portion 81 as well.

In a state wherein the attenuating medium 90 is stored in the first enclosure portion 80 and the second enclosure portion 81, the viscoelasticity treatment is applied. The viscoelasticity is added to the attenuating medium inside the second enclosure portion 81 so as to seal between the cap 12 and the shaft portion 40 of the rotor 16, and between the housing 11 and the shaft portion 40 of the rotor 16.

The second enclosure portion 81 is provided in a vicinity of the shaft portion 40 wherein shear of the attenuating medium 90 accompanied by the rotation of the rotor 16 does not occur. Consequently, even if air is enclosed in the second enclosure portion 81 together with the attenuating medium 90, air thereof is difficult to be mixed in the attenuating medium 90 of the torque generating area 70.

As explained above, with respect to the damper and the method for manufacturing the damper according to the present embodiment, the following effects can be obtained further in addition to the effects (1) and (2).

(3) The second enclosure portion 81 is provided between the housing 11 and the shaft portion 40 of the rotor 16. After the attenuating medium 90 is guided to the second enclosure portion 81, the viscoelasticity is added to the attenuating medium 90, so that the attenuating medium 90 thereof seals between the housing 11 and the shaft portion 40 of the rotor 16, thereby the seal member such as the gasket and the like can become unnecessary. Also, a portion wherein the second enclosure portion 81 is provided is located between the housing 11 and the shaft portion 40 of the rotor 16, so that the shear of the attenuating medium 90 is difficult to occur at the relevant portion, and a movability of the attenuating medium 90 is low. Consequently, even in a case wherein the second enclosure portion 81 is provided between the housing 11 and the rotor 16, a mixed air amount into the torque generating area 70 from the second enclosure portion 81 can be reduced.

(4) The second enclosure portion 81 is provided between the cap 12 and the shaft portion 40 of the rotor 16. After the attenuating medium 90 is guided to the second enclosure portion 81, the viscoelasticity is added to the attenuating medium 90, so that the attenuating medium 90 thereof seals between the cap 12 and the shaft portion 40 of the rotor 16, thereby the seal member such as the gasket and the like can become unnecessary. Also, the portion wherein the second enclosure portion 81 is provided is located between the cap 12 and the shaft portion 40 of the rotor 16, so that the shear of the attenuating medium 90 is difficult to occur at the relevant portion, and the movability of the attenuating medium 90 is low. Consequently, even in a case wherein the second enclosure portion 81 is provided between the cap 12 and the rotor 16, the mixed air amount into the torque generating area 70 from the second enclosure portion 81 can be reduced.

Third Embodiment

Next, a third embodiment of the damper and the method for manufacturing the damper will be explained with a focus on differences with the first embodiment. Incidentally, the damper and the method for manufacturing the damper according to the present embodiment have a basic structure thereof equal to that of the first embodiment as well, and an overlapping explanation will be omitted.

Figure 8:
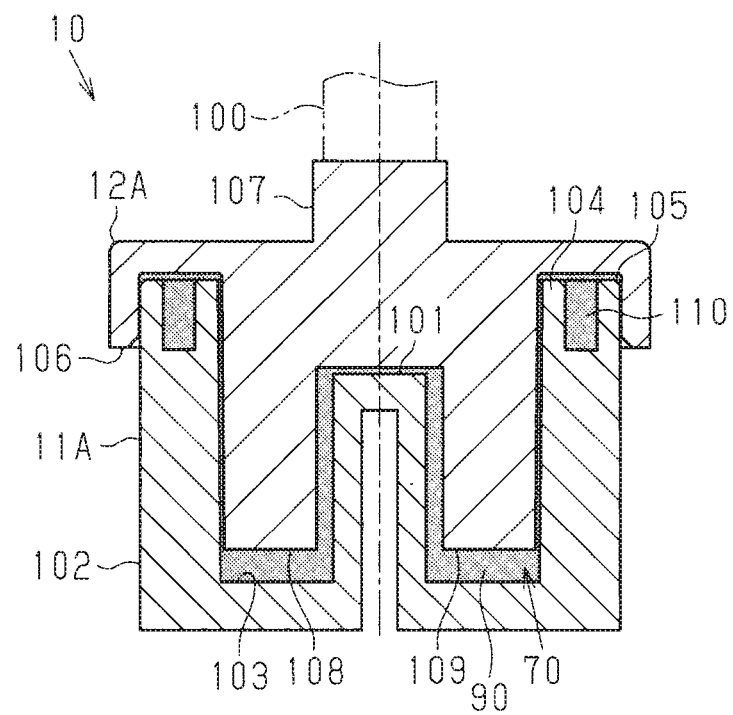
FIG. 8 is a drawing showing a cross section of the damper after the assembly for a third embodiment of the damper and the method for manufacturing the damper according to the present invention.

As shown in FIG. 8, the damper 10 of the present embodiment includes a housing 11A and a cap 12A turnably mounted relative to the housing 11A.

The housing 11A is formed in a cylindrical shape including a bottom portion, and at a center portion of a bottom face thereof, there is formed a projecting portion 101. Inside the housing 11A, there is formed a concave portion 103 between the projecting portion 101 and a peripheral wall portion 102. Incidentally, a plurality of concave portions 103 may be provided.

Also, in the peripheral wall portion 102 of the housing 11A, there is formed a pair of annular projecting portions 104 and 105. Those annular projecting portions 104 and 105 may be provided with three or more as well.

The cap 12A comprises a shaft connection portion 107 connecting the turning shaft 100. The cap 12A is formed in a disk shape, and an edge portion 106 thereof bends at a right angle. On a lower face of the cap 12A, there are formed cap projecting portions 108 and 109. A gap between the cap projecting portions 108 and 109, and the concave portion 103 of the housing 11A becomes the torque generating area 70. In this torque generating area 70, the attenuating medium 90 is sheared by a rotation of the cap 12A.

When the cap 12A is mounted on the housing 11A, an enclosure portion 110 is formed by the lower face of the cap 12A and the annular projecting portions 104 and 105 of the housing 11A.

Next, the method for manufacturing the damper 10 will be explained with procedures of an assembly thereof.

First, in the housing 11A, the attenuating medium 90 before the viscoelasticity treatment is applied is injected into the housing 11A. When the attenuating medium 90 is injected into the housing 11A, in order to prevent air from being mixed into the attenuating medium 90, it is preferable to inject the attenuating medium 90 under the reduced-pressure atmosphere.

Furthermore, the cap 12A is mounted on the housing 11A wherein the attenuating medium 90 is filled. At that time, the cap projecting portions 108 and 109 fit in the concave portion 103 so that the attenuating medium 90 located in the concave portion 103 of the housing 11A is pushed out. The pushed-out excess attenuating medium 90 is guided between the annular projecting portions 104 and 105 of the housing 11A and the cap 12A. Incidentally, even when the cap 12A is mounted, it is preferable to mount the cap 12A under the reduced-pressure atmosphere.

When the cap 12A is mounted on the housing 11A, it becomes a state wherein the excess attenuating medium 90 is stored in the enclosure portion 110. At that time, as needed, the cap 12A and the housing 11A are thermally welded.

Thus, in a state wherein the excess attenuating medium 90 is stored in the enclosure portion 110, the viscoelasticity treatment is applied relative to the attenuating medium inside the damper 10. For example, the viscoelasticity is added to the attenuating medium by heating at the predetermined temperature for the predetermined time.

As a result, the viscoelasticity is added to the attenuating medium 90 inside the torque generating area 70 and the attenuating medium inside the enclosure portion 110. The attenuating medium inside the enclosure portion 110 encloses air together with the attenuating medium, however, since the enclosure portion 110 is provided outside the torque generating area 70, even if the cap 12A rotates, the mixture of air into the torque generating area 70 is suppressed.

As explained above, with respect to the damper and the method for manufacturing the damper according to the present embodiment, the following effect can be obtained further in addition to the effect (2).

(5) In the damper 10, the enclosure portion 110 wherein the attenuating medium 90 is enclosed is provided outside the torque generating area 70 which is the movable area wherein the cap 12A which is the movable member rotates. Consequently, the attenuating medium 90 before applying the viscoelasticity treatment is injected into the housing 11A slightly more for a portion of guiding to the enclosure portion 110, and the cap 12A is mounted on the housing 11A, so that the attenuating medium 90 which becomes excess relative to the volume of the torque generating area 70 can be guided to the enclosure portion 110. Thereby, the attenuating medium 90 can be filled thoroughly inside the torque generating area 70. Furthermore, after the attenuating medium 90 is injected into the housing 11A, the viscoelasticity treatment is applied so as to add the viscoelasticity to the attenuating medium 90 inside the torque generating area 70 and the attenuating medium 90 stored inside the enclosure portion 110. Consequently, the mixture of air caused by the gap wherein the attenuating medium 90 is not filled in the torque generating area 70 can be suppressed. Furthermore, in the enclosure portion 110, air is enclosed together with the attenuating medium 90, however, since the enclosure portion 110 is provided outside the torque generating area 70, even if the cap 12A rotates, the mixture of air into the torque generating area 70 from the enclosure portion 110 can be suppressed. Therefore, the damping force can increase by using the attenuating medium 90 having the viscoelasticity, and the stable damping force can be obtained by suppressing the mixture of air into the torque generating area 70.

Other Embodiments

Incidentally, the aforementioned respective embodiments can be carried out with the following embodiments as well.

In the first embodiment, the enclosure portion 80 has the bend structure, however, it may have a straight flow channel communicating with the torque generating area 70. In short, it is preferable that the enclosure portion 80 is a space communicating with the movable area which is the torque generating area 70, and is formed such that a narrow space or a space having a complicated structure is formed to a degree that the attenuating medium is suppressed from moving to the movable area or entering from the movable area in the enclosure portion compared to a flow of the attenuating medium inside the movable area even if the attenuating medium inside the movable area moves accompanied by the movement of the movable member in the movable area.

In the first embodiment, the rotor 16 includes the upper rotor projecting portions 41 to 43 and the lower rotor projecting portions 51 to 53, and has a shape having a concave-convex structure fitting the cap 12 and the housing 11. Other than that, the shape of the rotor 16 may have a flat plate shape without the concave-convex structure fitting the cap 12 and the housing 11.

In the second embodiment, the rotary damper with a type wherein the cap 12 is externally fitted in the housing 11 has been explained, however, it may be the rotary damper with a type wherein the cap 12 is internally fitted in the opening of the housing 11.

The enclosure portion of the first embodiment and the second embodiment has a structure with a plurality of bendings, however, the number of bending points may be any number. Also, the enclosure portion of the first embodiment and the second embodiment may have a structure without bending.

In the aforementioned respective embodiments, the rotor or the cap is combined with the cylindrical housing having the bottom portion, however, the housing may have a shape other than the cylindrical shape having the bottom portion. For example, the housing and the rotor which is the rotation member may have the same shape, and form the torque generating area 70 by combining those.

The damper rotates while shearing the attenuating medium added with the viscoelasticity so as to generate the damping force. Consequently, the damper can generate the damping force sufficient to buffer an impact accompanied by a turning movement of a seat back.

Figure 9:
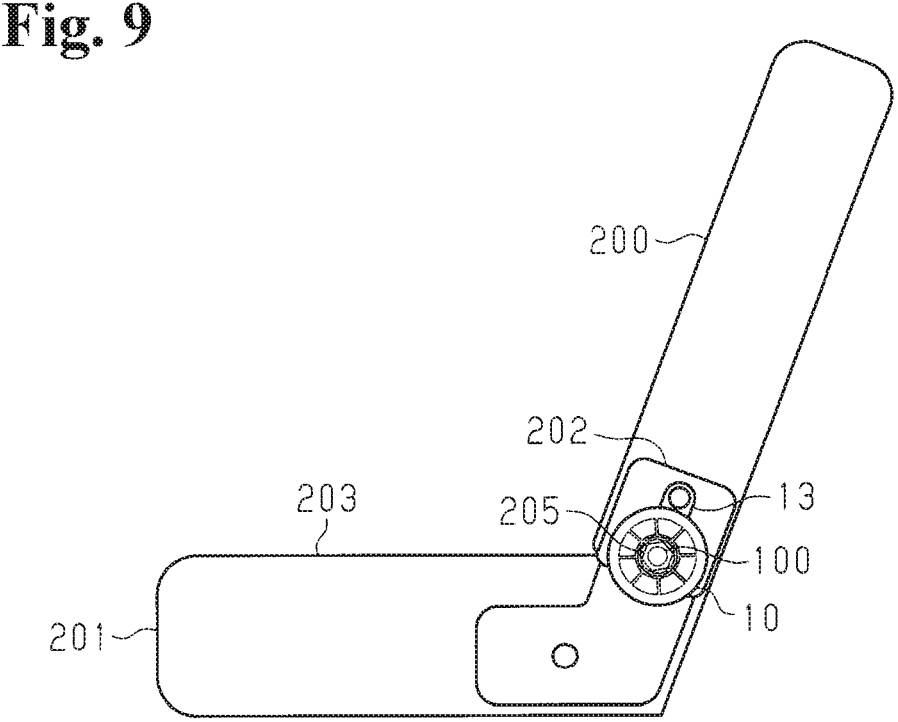
FIG. 9 is a drawing showing an application example of the damper according to the present invention.

With reference to FIG. 9, an application example of the damper to a seat will be explained. The damper 10 (damper for seat) forms a turning structure for turning a seat back 200 which is a backrest relative to a seat cushion 201 including a seating surface 203. The turning mechanism is a reclining mechanism fixing the seat back 200 in a state of being reclined to a side opposite to the seat cushion 201, or a folding mechanism folding the seat back 200 in such a way as to contact the seating surface 203. In the damper 10, the attachment portion 13 thereof is fixed in a connection portion 202 provided in the seat back 200 by a fastening portion such as a screw and the like. The turning shaft 100 turnably supporting the seat back 200 is inserted through the shaft hole 15 (see FIG. 1) of the damper 10, and a fastening portion 205 such as a nut and the like is fastened to a tip of the turning shaft 100. When the seat back 200 turns to a seat cushion 201 side or an opposite side thereof around the turning shaft 100, the damper 10 adds the damping force to the turning shaft 100, and buffers the impact accompanied by the turning movement of the seat back 200. Incidentally, the seat and the turning mechanism thereof may have a structure other than the structure shown in FIG. 9.

The damper 10 may be provided in the attenuating object (the object wherein the damping force is added) other than the seat, or in the support member (supporting the damper 10).

Next, technical ideas which can be comprehended from the aforementioned embodiments and another example will be added hereinafter with effects thereof.

(a) The method for manufacturing the damper including the housing and the rotation member combined with the relevant housing so as to be capable of turning relative to the housing, includes a process for filling the attenuating medium before the viscoelasticity is added, inside the housing; a process for guiding the attenuating medium to the enclosure portion provided outside the rotation area of the rotation member, and communicating with the relevant rotation area by combining the rotation member with the housing; and a process for adding the viscoelasticity to the attenuating medium by applying the viscoelasticity treatment relative to the attenuating medium inside the rotation area and the attenuating medium inside the enclosure portion.

EXPLANATION OF SYMBOLS

10 . . . a damper, 11 and 11A . . . a housing, 12 . . . a cap as a lid member, 12A . . . a cap as a rotation member, 16 . . . a rotor as a rotation member, 40 . . . a shaft portion, 70 . . . a torque generating area as a turning area, 80 . . . an enclosure portion (first enclosure portion), 81 . . . a second enclosure portion, 90 . . . an attenuating medium, 110 . . . an enclosure portion, 200 . . . a seat back, 201 . . . a seat cushion, and 203 . . . a seating surface.

What is claimed is:
1. A damper, comprising:
a housing having a rotation area;
a cap covering the housing;
a rotation member combined with the housing so as to turn relative to the housing and cap;
an attenuating medium filled in the rotation area of the rotation member, and added with viscoelasticity by a viscoelasticity treatment; and
an enclosure portion provided radially outside the rotation area, communicating with the rotation area, and enclosing an excess attenuating medium relative to the rotation area to which the rotation member is combined,
wherein the enclosure portion includes a bend structure,
the cap covers the rotation area of the housing and includes annular projecting portions, as a part of the bend structure, radially outside the rotation area, and
the housing further includes two projections, as a part of the bend structure, radially outside the rotation area, and a recess between the two projections so that upon assembly of the damper, the annular projecting portions engage the two projections with the recess to form the enclosure portion separate from the rotation area, the rotation member being sandwiched between the cap and the housing in the rotation area.

2. A damper according to claim 1, further comprising another enclosure portion enclosing the attenuating medium between the housing and a shaft portion which becomes a rotation center of the rotation member.

3. A damper according to claim 1, further comprising another enclosure portion between the lid member closing an opening of the housing and a shaft portion which becomes a rotation center of the rotation member.

4. A damper according to claim 1, applied to a turn structure turning a seat back relative to a seat cushion including a seating surface.

\* \* \* \* \*